(No Model.) 3 Sheets—Sheet 1.
C. W. McDANIEL.
FURNACE MOUTH FEED WATER HEATER.

No. 495,428. Patented Apr. 11, 1893.

WITNESSES
Harry King
Jan G. Cameron

INVENTOR
C. W. McDaniel
F. C. Somes
Attorney (No Model.) 3 Sheets—Sheet 2.
C. W. McDANIEL.
FURNACE MOUTH FEED WATER HEATER.
No. 495,428. Patented Apr. 11, 1893.
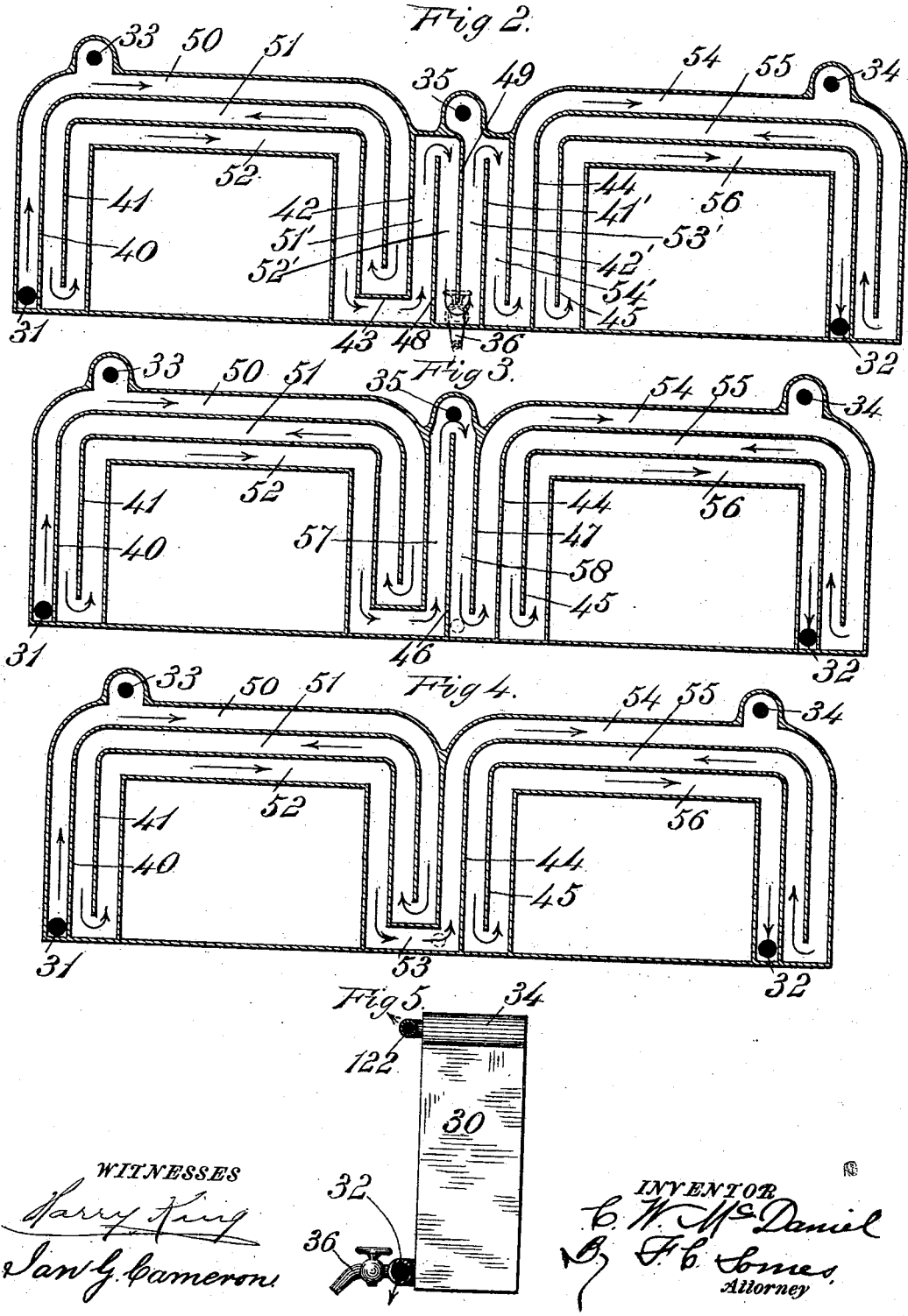

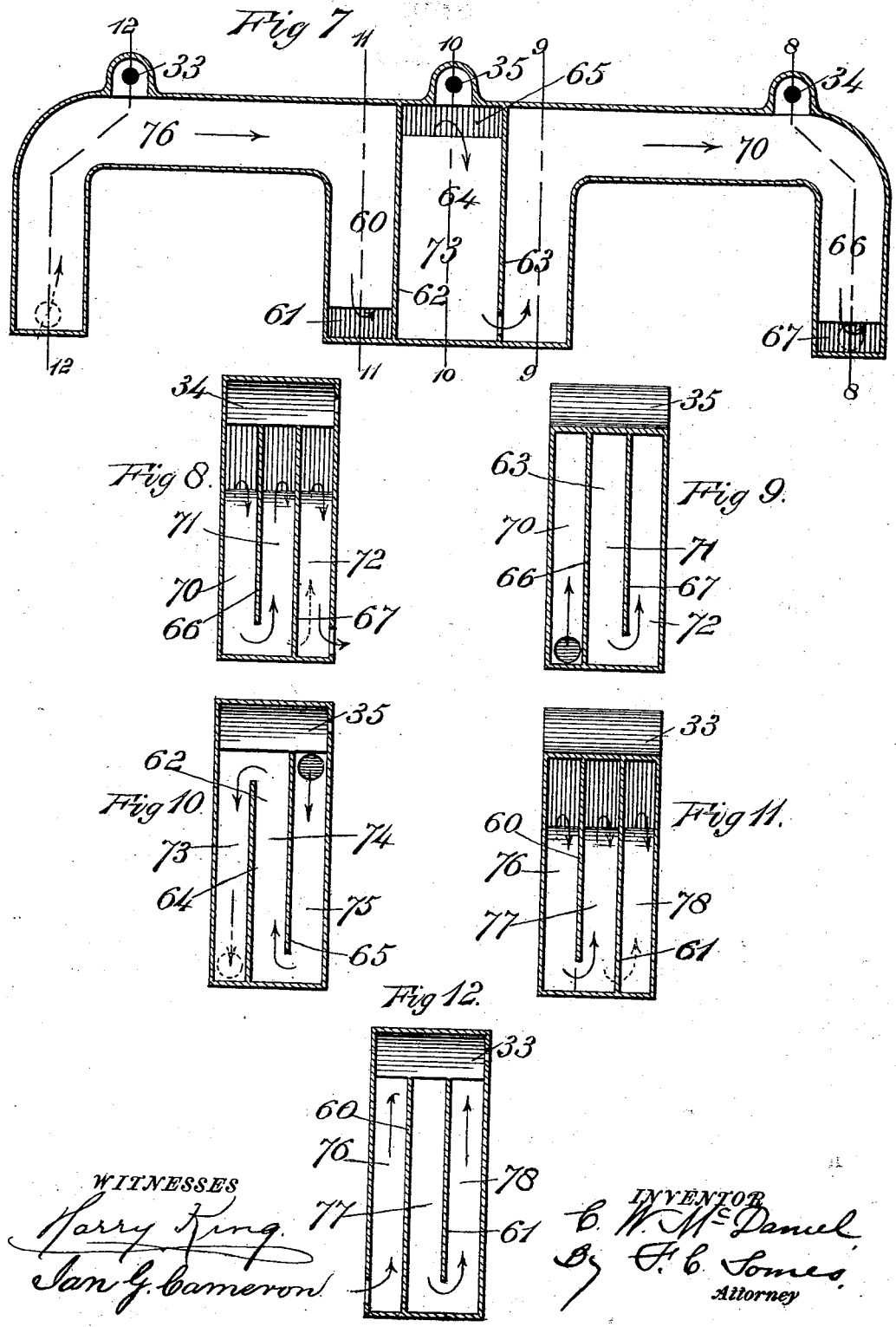

UNITED STATES PATENT OFFICE.

CHARLES W. McDANIEL, OF LAKEPORT, NEW HAMPSHIRE, ASSIGNOR TO THE ECONOMY FEED WATER HEATER COMPANY, OF NEW HAMPSHIRE.

FURNACE-MOUTH FEED-WATER HEATER.

SPECIFICATION forming part of Letters Patent No. 495,428, dated April 11, 1893.

Application filed January 28, 1893. Serial No. 460,056. (No model.)

*To all whom it may concern:*

Be it known that I, CHARLES W. MCDANIEL, a citizen of the United States of America, residing at Lakeport, in the county of Belknap, in the State of New Hampshire, have invented certain new and useful Improvements in Furnace-Mouth Feed-Water Heaters, of which the following is a specification.

This invention relates to hollow furnace mouth casings for steam boiler furnaces through which the feed water for supplying the boiler is passed, whereby the water is given a preliminary heating and the furnace mouth is protected against the destructive effects of the fire.

The principal object of the invention is to provide a feed water heater utilizing both mouths of a steam-boiler furnace and the space between said mouths as water channels for the feed water; whereby the construction is simplified, the water course elongated, and the furnace mouths thoroughly protected.

Figure 1:
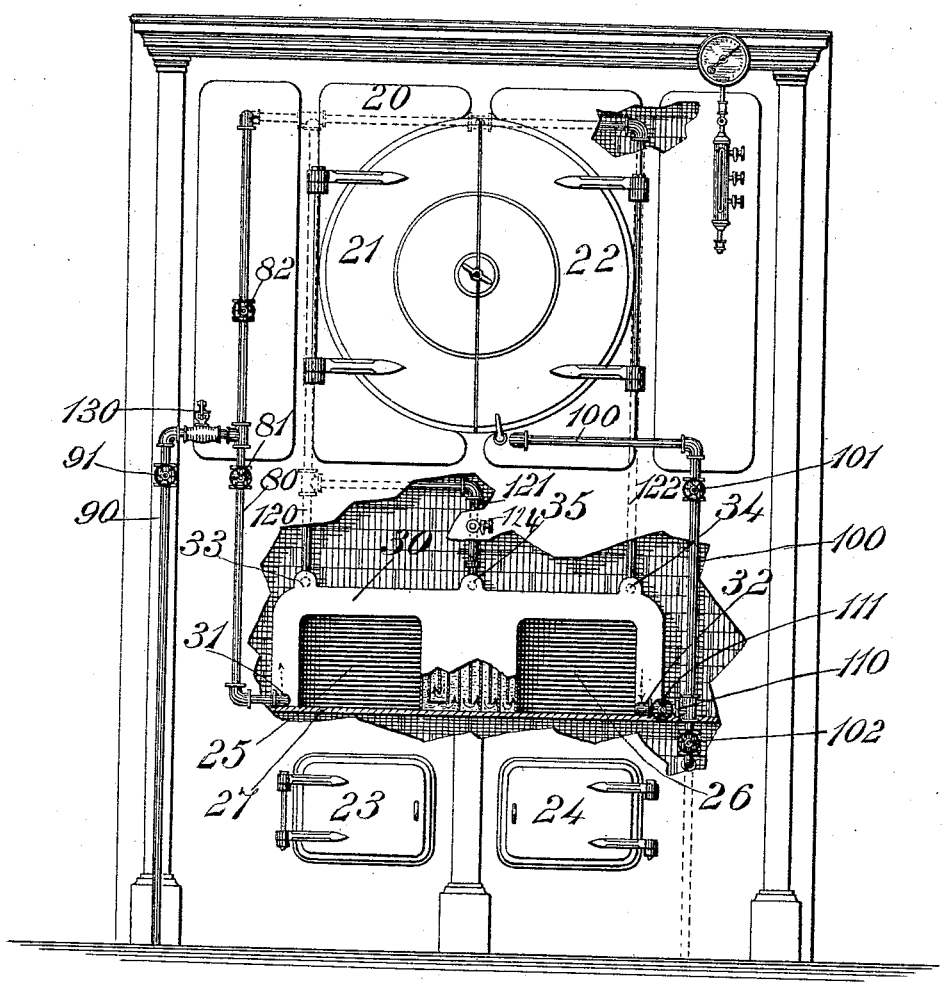
Figure 6:
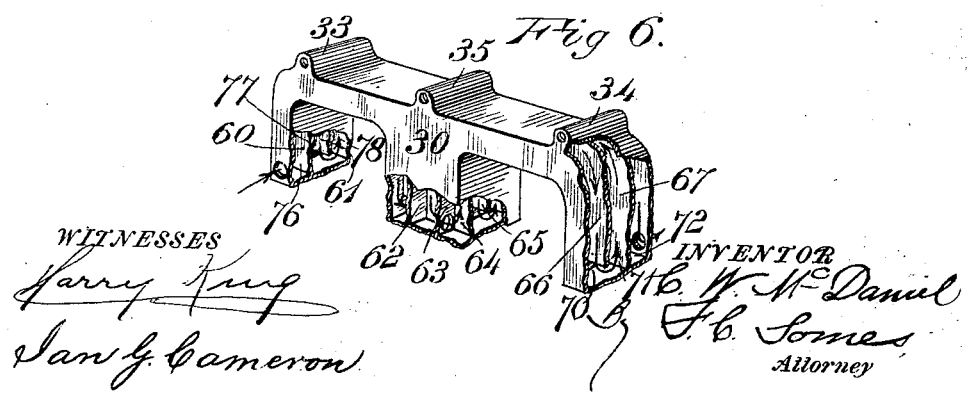

Figure 1 of the accompanying drawings represents a front elevation of a full arch front boiler setting for a stationary horizontal steam boiler provided with this duplex furnace-mouth feed-water heater, a portion of the front plate of the boiler setting being broken out and a portion of the front plate of the middle leg of the feed-water heater being broken away. Fig. 2 represents a longitudinal vertical section on an enlarged scale of the duplex furnace-mouth feed-water heater shown in Fig. 1, in which the water channels are superposed upon each other and connected together forming a continuous course. Fig. 3 represents on an enlarged scale a horizontal vertical section of this duplex furnace-mouth feed-water heater in which the intermediate channels between the two mouths are reduced in number. Fig. 4 represents on an enlarged scale a longitudinal vertical section of this duplex furnace-mouth feed-water heater in which the sections for the two doors are in close connection with each other, the central dome being omitted. Fig. 5 represents an end elevation of this furnace-mouth feed-water heater. Fig. 6 represents a perspective view of this duplex feed-water furnace-mouth in which the water channels are disposed side by side and connected to form a single continuous course, parts being represented as broken out to show the interior construction. Fig. 7 represents on an enlarged scale a longitudinal vertical section of the duplex feed-water furnace-mouth shown in Fig. 6, the front thereof being removed. Fig. 8, represents on an enlarged scale a transverse section of the furnace-mouth shown in Fig. 7, the section being taken on lines 8—8 of said figure. Fig. 9 represents on an enlarged scale a transverse section on the line 9—9 of Fig. 7. Fig. 10 represents on an enlarged scale a transverse section on lines 10—10 of Fig. 7. Fig. 11 represents on an enlarged scale a transverse section on line 11—11 of Fig. 7. Fig. 12 represents on an enlarged scale a transverse section on line 12—12 of Fig. 7.

The same reference numbers indicate the same parts in all the figures.

This furnace-mouth feed-water heater is represented in the accompanying drawings as applied to a full arch front boiler setting, but it may obviously be applied to a half-arch front or to any steam-boiler furnace having two feed-doors. The front plate 20 of the boiler setting is provided on its inner portion with doors 21 and 22 opening into the uptake at the front end of the return flue boiler: and on its lower portion with two ash pit doors 23 and 24, the portion of said plate to which the feed doors are hinged being broken out, showing the two furnace-mouths 25 and 26. A dead plate 27 extends horizontally across the front and constitutes the bottoms of the furnace-mouths.

A hollow casing 30 constructed approximately in the form of the lower case letter m is set in the brickwork of the front of the furnace and rests on the dead plate 27. This casing constitutes the feed-water heater and side walls and tops of the furnace-mouths and extends from the front to the rear of the wall, the full depth of the furnace-mouths. This casing has partitions dividing its interior into tortuous channels forming a continuous water course, and it is provided at one end on one side with an inlet opening 31 and at its outer end on its opposite side with an outlet opening 32. It is provided at its top near its end legs with drums 33 and 34 and over its middle leg with a drum 35.

In the construction represented in Figs. 2, 3 and 4, the partitions touch the front and rear faces of the casing and extend parallel with the inner and outer walls thereof forming connected superposed water cannels. The outer interior partition 40 extends from the bottom of the left leg of the casing up through said leg thence over the top of the first arch and thence down into the middle leg, terminating above the bottom thereof. The inner interior partition 41 extends from a point above the bottom of the left leg up therethrough, thence over through the top of the left arch thence down through the middle leg to a point above the bottom thereof but below the terminal point of the partition 40. A partition 42 constituting a continuation of the outer wall of the top of the first arch depends into the middle leg and terminates at a point opposite the terminal point of the partition 41, and a short horizontal partition 43 connects the ends of the partitions 41 and 42 in a plane between the terminal point of the partition 40 and the bottom of the leg.

In Fig. 4, the partition 42 constitutes also a continuation of the outer wall of the top of the second arch and said arch is provided with an outer partition 44 which extends from the bottom of the middle leg, through said arch terminating near the bottom of the right hand leg, and an inner partition extends from a point above the bottom of the middle leg to the bottom of the left leg. These partitions form in the first arch three superposed water courses or channels; an outer channel 50, an inner channel 52 and an intermediate channel 51, the channels 50 and 51 being connected in the middle leg and the channels 51 and 52 being connected in the left leg. The partitions of the second arch form three similar superposed channels, an outer channel 54, a middle channel 55, and an inner channel 56. The outer channel 54 of the second arch is connected in Fig. 4 by the short horizontal channel 53 between the partition 43 and the bottom of the middle leg, the channel 55 is connected with the channel 54 at the bottom of the right hand leg and the channel 56 is connected with the channel 55 at the bottom of the middle leg.

In Fig. 3 a vertical partition 46 extends upward from the bottom of the middle leg terminating at the steam dome over said leg, and a partition 47 depends from the top of said leg, these partitions forming two additional connected vertical water channels 57 and 58.

In Fig. 2 four intermediate vertical partitions 48, 49, 41' and 42' are disposed in the middle leg forming intermediate water channels 51', 52', 53' and 54' connected with each other and with the channels of the arches.

In Figs. 7 to 12 the interior partitions in the duplex furnace mouth casing, touch the inner and outer walls of the casing and extend parallel with the front and rear faces thereof. This form of furnace-mouth feed-water heater is provided with interior longitudinal partitions 60 and 61 in the first arch, with transverse partitions 62 and 63 in the middle leg; with longitudinal partitions 64 and 65 between the transverse partitions, and with longitudinal partitions 66 and 67 in the second arch, forming channels 70, 71 and 72 in the second arch, as shown in Figs. 8 and 9, channels 73, 74 and 75 in the center of the middle leg as shown in Fig. 10 and channels 76, 77 and 78 in the first arch as shown in Figs. 11 and 12.

The casing is provided at its bottom in one or more of its legs with a blow off cock or cocks 36 for clearing it of sediment.

A pipe 80 having two valves 81 and 82 connects the inlet opening 31 of the casing 30 with the boiler above the water line thereof, and a supply pipe 90 having a valve 91 is connected by a coupling to said pipe 80 between the valves 81 and 82, the lower part of said pipe when the valves are adjusted to this end constituting a feed pipe for the casing. A feed pipe 100 for feeding the boiler connects the latter below the water line with the outlet opening 32 of the feed-water heater, being provided with valves 101 and 102.

A supply pipe 110 provided with a valve 111 is connected with the boiler feed pipe 100 and may be used for feeding the boiler direct without the intervention of the feed water heater when desired.

Pipes 120, 121 and 122 connect the drum of the feed-water casing 30 with the steam space of the boiler, the pipe 121 discharging into the pipe 120 as shown if desired. The pipe 121 is provided with a blow off cock 124.

A safety valve 130 may be disposed on pipe 90 between its valve and its connection with the pipe 80.

In the use of this feed-water heater, the upper valve 82 in the pipe 80 is closed, the lower valve 81 thereof open and the valve 91 in the supply pipe 90 open to permit a flow of water from the supply pipe 90 through the feed pipe 80 to the left hand end of the casing 30 into the channel 50. The cock 111 in the branch supply pipe is closed and the cocks 101 and 102 in the pipe 100 are open. The water then flows through the tortuous channels of the first arch around the mouth 25, thence through the tortuous channels in the middle leg of the casing between the two mouths, thence through the tortuous channels in the second arch around the mouth 26, thence through the feed pipe 100 into the boiler. When there is no feeding being done the cock 91 in the supply pipe 90 is closed and the cock 82 in the pipe 80 is opened, whereby communication is established between the feed-water heater 30 and the steam space of the boiler, and a circulation can be maintained through the heater in this way. In case it be desired to feed directly into the boiler without the intervention of the feed-water heater, this can be done by closing the cock 91 in the supply pipe 90 and opening the cock 111 in the branch supply pipe. In case any steam is formed in the channels of the heater it rises into the drums and thence passes up through the pipes 120, 121 and 122 connecting said drums with the steam space of the boiler.

The casing may be cast in one piece if desired and is readily set into the wall of the furnace, and when so set utilizes not only the space around both furnace mouths, but the intervening space between said mouths as heating surfaces. It is obvious that the arrangement of the channels may be varied without departure from the scope of this invention.

I claim as my invention—

1. A furnace mouth feed-water heater consisting of an m-shaped casing embracing two furnace mouths and having water channels in its top and in its middle and end legs, said channels being connected in series throughout the casing.

2. A furnace-mouth feed-water heater consisting of a hollow casing embracing two furnace-mouths and having a system of channels around the sides and top of one of said mouths, a system of water channels around the sides and top of the other mouth, and an intermediate system of channels between said mouths.

3. A furnace-mouth feed-water heater consisting of a casing having two arches, each provided with a system of water channels, and an intermediate system of water channels between said arches connected with those in the arches.

4. A furnace-mouth feed-water heater consisting of an m-shaped casing cast in one piece and provided with interior connected water-channels and with a steam drum over the channels of the middle leg.

5. The combination with a steam boiler and a steam boiler furnace of an m-shaped casing surrounding the furnace-mouths, and provided with water-channels in its top and in its middle and end legs, a supply pipe connected with said casing and a boiler feed-pipe also connected with said casing.

6. The combination with a steam boiler and a steam boiler furnace of an m-shaped casing surrounding the furnace-mouths, and provided with water channels in its top and in its middle and end legs, and with drums in its top, a supply pipe connected with said casing, a boiler feed-pipe also connected with said casing, and pipes connecting said drums with the steam space of the boiler.

CHARLES W. McDANIEL.

Witnesses:
HENRY B. QUINBY,
ALBERT C. MOORE.